Patented Sept. 15, 1953

2,652,385

UNITED STATES PATENT OFFICE 2,652,385

SILOXANE RESINS

Melvin J. Hunter, Midland, Mich., and Earle J. Smith, Hasbrouck Heights, N. J., assignors to Dow Corning Corporation, Midland, Mich., a corporation of Michigan No Drawing. Application January 6, 1947, Serial No. 720,470

2 Claims. (Cl. 260—46.5)

The present invention relates to synthetic resins of the general class of organo-substituted polysiloxanes, in which the substituent organic groups are both methyl and phenyl radicals. Such resins are polymers which are composed of organo-substituted silicon oxide units.

The hydrophobic character and high dielectric capacity of the siloxane resins are well known. Physical properties of the siloxane resins, such as resistance to decomposition at high temperatures and small change in physical properties at elevated temperatures, suggest many uses. Satisfactory siloxane resins have been produced which may be cured in thin exposed sections or in deep molding sections. Rapid curing resins may be used as adhesives or as molding powders. Other physical properties, for example a high degree of scratch hardness, are desirable for certain industrial applications. Improved resins for use in roller coating would be desirable.

Objects of the present invention are to provide siloxane resins of commercial utility; to provide siloxane resins useful as varnishes or as paint vehicles; to provide siloxane resins which in cured state possess a high degree of scratch hardness; to provide siloxane resins which are suitable for roller coating; to provide siloxane resins suitable for use as molding resins which may be molded in deep section; and to provide improved methods for the production of resins containing monomethyl siloxane units.

Other objects and advantages of the present invention will be apparent from the following description.

In the siloxanes of the present invention essentially all of the siloxane structural units are substantially as follows:

$CH_3SiO_{1.5}$
$C_6H_5SiO_{1.5}$
$(CH_3)_2SiO$

The siloxanes herein described preferably contain dimethyl siloxane units in amount between 2.5 and 4.5 mol per cent, methyl siloxane units in amount between 10 and 80 mol per cent, and phenyl siloxane units in amount between 10 and 65 mol per cent. The silicon atoms of the siloxane structural units are linked together by the oxygen atoms thereof in an alternating lattice of oxygen and silicon atoms.

The siloxanes of the present invention are desirably produced by the hydrolysis of monosilanes which have the desired organic substituents and which have hydrolyzable atoms or groups as the remaining substituents. Such groups include alkoxy radicals, for instance ethoxy, and halogen, for instance chlorine. The hydrolyzates produced upon hydrolysis of these silanes are partially condensed siloxane interpolymers which contain various siloxane structural units. These hydrolyzates are of wide utility. By varying the degree of organic substitution, a considerable variation in the setting time is obtained. Low rates are obtained with degrees of substitution above about 1.2 organic radicals per silicon, whereas higher rates are obtained with low degrees of substitution. The hydrolyzates are soluble in aromatic and other solvents. The hydrolyzates are miscible with soluble siloxane resins generally, as for instance copolymers of monomethylsiloxane, monophenylsiloxane, and methylphenylsiloxane structural units.

The hydrolyzates of higher degree of substitution, i. e. above about 1.2 organic radicals per silicon (above about 20 mol per cent dimethyl siloxane) are particularly desirable as coating compositions. They may be employed in solution as varnishes, or, with the addition of pigments, as paints. These varnishes and paints may be applied to metal or other surfaces by brushing, spraying, or dipping as is customary with siloxane varnishes and paints. They have the outstanding and unique property of being useful for application by roller coating, producing a smooth coating which adheres well to the surface. When air-dried the resins are either slightly tacky or free of tackiness. Upon curing at elevated temperature, the films produced have high scratch hardness, being comparable in properties to vitreous enamel but requiring a much lower baking temperature. This avoids the warpage frequently encountered with vitreous enamel on drawn sheet metal. In any instance in which it is desired to employ the hydrolyzates, and higher viscosity is desired, a small amount of an alkyl or other organo cellulose ether such as ethyl cellulose may be added to the solution of the hydrolyzate.

Catalysts, such as conventional paint driers, may be employed with any of the compositions used as paint resins in order to increase the curing rate, particularly at low temperatures. In the production of paints from the resins hereof, pigments of any desired color may be employed whereby a wide range of colored siloxane paints is available. In the selection of pigments, care should be employed to select thermally stable pigments in order to avoid discoloration thereof within the normal operating range of the siloxanes.

The hydrolyzates of lower degree of organic substitution are of particular utility as thermosetting resins for uses which require the ability to set in deep section. Thus, these resins are useful for making moldings, and for adhesives for securing together glass laminae or mica. The outstanding advantage of the present resins for such uses is their strength, both at room temperature and at high temperatures. These resins may be employed alone, or may be fabricated in the form of molding powder by incorporation of a filler, or in the form of molding sheets by impregnating fabric sheeting with the resin and drying to remove solvent. Catalysts, such as an ethanolamine or a conventional paint drier, may be employed with any of the compositions used as deep setting resins to increase the curing rate of the resins, particularly at low temperatures.

The hydrolyzates of either high or low degree of substitution may be bodied by heating a solution of the hydrolyzate. By this procedure a resin is obtained which is of increased viscosity, the specific viscosity depending upon the specific bodying method which is employed. Before bodying, the hydrolyzates generally contain above about 0.2 weight per cent of hydroxyl, which is reduced by bodying.

The exact mode of operation of each of the types of siloxane units included in the present siloxanes cannot be stated definitely. The monomethyl and monophenyl siloxane units, being trifunctional, copolymerize to form the general three dimensional structure of the polymer molecules. The dimethyl siloxane units are difunctional and interpolymerize in the three dimensional polymer structure.

The organosilicon derivatives which are hydrolyzed to produce the resins of the present invention should be substantially free of hydrolyzable siliceous compounds other than those in which the only organic substituents attached to the silicon through carbon to silicon bonds are monomethyl, monophenyl, and dimethyl. The hydrolyzable organosilicon derivatives should be substantially free of silicon tetrahalides and alkyl orthosilicates. The remaining valences of the silicon in these derivatives may be satisfied with readily hydrolyzable elements or radicals such as halogens, alkoxy, aroxy, or amino radicals. These silanes may be produced by any appropriate method such as is known in the art.

Generally the production of siloxanes from the silanes involves the hydrolysis of the silanes, which hydrolysis is accompanied by polymerization. Any specific method for carrying out the hydrolysis may be employed. The hydrolysis may be effected by reacting the organosilicon derivatives with water. The temperature during the hydrolysis should be sufficiently low that at the pressure employed the methyl silane derivative does not evaporate readily.

A preferred hydrolysis method involves the mixing of the silanes with a two phase system of water and an organic collecting solvent. Aromatic solvents such as toluene and benzene are of utility for this purpose. The aliphatic ethers are particularly desirable as collecting solvents in the non-aqueous phase. They may be employed either alone or in mixture with aromatic hydrocarbon solvents. By aliphatic ether is meant aliphatic organic compounds which contain a carbon-oxygen-carbon group, for example, diethyl ether, $(C_2H_5 \cdot O \cdot C_2H_5)$; "Diethyl Cellosolve," $(C_2H_5 \cdot O \cdot C_2H_4 \cdot O \cdot C_2H_5)$; and dioxan

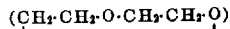

This described hydrolysis method which involves mixing of the silanes with a two phase medium comprising water and an aliphatic ether is of general application in the production of siloxanes from hydrolyzable silanes containing monomethyl silicon trichloride. Thus, this method of hydrolysis is of advantage in the production of resins containing monomethyl, monophenyl, and methylphenyl siloxane units. The hydrolyzates prepared by this method condense to an insoluble state more rapidly on heating, are obtained in higher yields, and are more easily washed with water to reduce the acidity of the resin solution than those prepared using a non-etherial collecting solvent.

It is preferred from a commercial standpoint to hydrolyze the silanes in mixture. However, practical results are obtained by the separate hydrolysis of the silanes and the limited interpolymerization of the hydrolysis products in the desired proportions.

When the silane derivatives which are hydrolyzed contain halogen substituents, hydrogen halides are produced in the hydrolysis. The hydrogen halide may be totally or partially retained in solution in the aqueous phase. The amount of hydrogen halide in the aqueous phase is dependent on the temperature, pressure, and amount of water present.

When the silane derivatives which are hydrolyzed include alkoxy silanes, the corresponding alcohol is a product of the hydrolysis. The alcohol so formed may be retained in the aqueous phase. The aqueous layer may be separated following hydrolysis.

Polymerization of the hydrolysis products occurs during the hydrolysis to give a siloxane. Further partial condensation or extensive polymerization may be effected by heating or otherwise treating the partially polymerized material, as above indicated. When bodying is desired, the silane derivatives may be hydrolyzed separately, blended, and then intercondensed. The rate at which bodying occurs during heating at a given temperature is a function by the specific composition, the rate decreasing with increasing dimethyl components. The hydrolyzates containing higher percentages of dimethyl siloxane structural units require longer heating periods or higher temperatures to effect the same degree of polymerization. The solvent may be allowed to evaporate during the bodying, or the solvent may be evaporated prior to bodying. The solvent may be evaporated by heating under vacuum to a temperature less than that necessary for bodying to occur to any appreciable extent. The extent of bodying may vary, although generally the hydrolysis product is condensed sufficiently that a liquid or solid resin is produced. A solvent may be added to the liquid or solid resin produced by bodying.

Molding powders consisting of the resins of the present invention and an inorganic filler may be prepared and molded articles formed therefrom. The inorganic filler may be in powder or fibrous form. Inorganic materials, such as metals, asbestos, diatomaceous earth, glass fiber, and the like, may be used as the filler. The resin in the mixture may be partially cured, by heating or any other means, before the molding powder is used in the molding operation. The powder so produced may be molded at room temperature or at an elevated temperature. When the molding is done at room temperature, the molded product may be cured in an oven. When the molding is effected at an elevated temperature, the molded product may be partially or completely cured in the press. It is preferred that the resin be only partially cured when the product is removed from the press and that the resin receive a final cure in an oven or the like.

Example 1

Four resins were prepared of the following compositions, employing reactants and reagents as indicated:

|  | No. 1 | No. 2 | No. 3 | No. 4 |
|---|---|---|---|---|
| Composition: | | | | |
| $CH_3SiO_{1.5}$ _____mol percent__ | 45 | 40 | 60 | 33.3 |
| $C_6H_5SiO_{1.5}$ _____do____ | 50 | 45 | 30 | 33.3 |
| $(CH_3)_2SiO$ _____do____ | 5 | 15 | 10 | 33.3 |
| Reagents: | | | | |
| $CH_3SiCl_3$ __parts by weight__ | 135 | 120 | 197 | 135 |
| $C_6H_5SiCl_3$ _____do____ | 212 | 190 | 140 | 190 |
| $(CH_3)_2SiCl_2$ _____do____ | 13 | 39 | 28 | 116 |
| Water _____do____ | 861 | 829 | 955 | 1,052 |
| Toluene _____do____ | 428 | 418 | 417 | 565 |
| Diethyl ether _____do____ | | | 482.5 | 290.6 |
| "Diethyl Cellosolve"__do____ | 250 | 223 | | |

The mixture of organosilicon chlorides was added to the mixture of water, toluene, and diethyl ether or "Diethyl Cellosolve" at a temperature of 15° C. The hydrolysis was conducted in a reaction vessel equipped with an agitator and a condenser. The reaction vessel was cooled by indirect heat exchange. The mixture of organosilicon chlorides was added at a rate sufficiently low that with the cooling provided the temperature did not rise above 25° C. After the hydrolysis of the organosilicon chlorides was complete, the toluene solution was decanted from the water. The toluene solution was washed with fresh water until the solution was alkaline to bromocresol purple indicator. The solvent was then removed by distillation to a concentration of 60 per cent solids.

The four resins so produced were each employed to make 0.25 inch square insulating bars by mixing the resins as solutions with equal weights of asbestos, together with 2 parts calcium stearate per 100 parts of resin-asbestos mixture. The mixture was vacuum dried at 110° C. and ground in a ball mill. The ground product was placed in a bar mold for 1 hour at 200° C. under a pressure of 2000 pounds per square inch. The bars were then cured for an additional 8 hours at 200° C. in an oven. The bars from these four resins had flexural strengths of 4200, 4107, 4015 and 4712 pounds per square inch respectively at 20° C. The bars had flexural strengths of 2240, 2370, 2027 and 1716 pounds per square inch respectively, at a temperature of 200° C.

Example 2

A resin was prepared of the following composition, employing reagents and reactants as indicated:

Composition:
- $CH_3SiO_{1.5}$ _____mol percent__ 30.3
- $C_6H_5SiO_{1.5}$ _____do____ 36.1
- $(CH_3)_2SiO$ _____do____ 33.6

Reagents:
- $CH_3SiCl_3$ _____parts by weight__ 50
- $C_6H_5SiCl_3$ _____do____ 85
- $(CH_3)_2SiCl_2$ _____do____ 48.2
- Water _____do____ 417
- Toluene _____do____ 180.5

The mixture of organosilicon chlorides was added to a mixture of 83.4 parts by weight of water and 180.5 parts by weight of toluene at such a rate that, with the cooling provided, the temperature did not rise above 30° C. After one-fifth of the mixture of organosilicon chlorides had been added the aqueous layer was removed and replaced by an equal volume of fresh water. Another one-fifth of the mixture of organosilicon chlorides was then added. This procedure was repeated until all the mixture of organosilicon chlorides had been introduced into the hydrolysis medium. The resulting solution was then washed with fresh water until the solution was alkaline to bromocresol purple indicator. The solvent was then removed by distillation to a concentration of 60 per cent solids. The resin was formed into insulating bars as in Example 1. The flexural strength of the bar was 5475 pounds per square inch at room temperature and 1412 pounds per square inch at 200° C. A composition consisting of 100 parts by weight of the resin of this example and 60 parts by weight of a commercial titania was baked on a metal panel at the temperature shown in the accompanying table for the indicated length of time. The scratch hardness of the resin-coated panel baked under the stated conditions was determined by the well-known method of employing pencils of varying hardness.

| Baking | | Panel Hardness |
|---|---|---|
| Time (hours) | Temp. (°C.) | |
| 1 | 140 | B |
| 4 | 140 | FF |
| 1 | 200 | H |
| 4 | 200 | 3H |
| 16 | 200 | 5H |
| 1 | 250 | 4H |
| 4 | 250 | 7H |

Example 3

A resin was prepared of the following composition, employing reactants and reagents as indicated.

Composition:
- $CH_3SiO_{1.5}$ _____mol percent__ 45
- $C_6H_5SiO_{1.5}$ _____do____ 35
- $(CH_3)_2SiO$ _____do____ 20

Reagents:
- $CH_3SiCl_3$ _____parts by weight__ 269
- $C_6H_5SiCl_3$ _____do____ 296
- $(CH_3)_2SiCl_2$ _____do____ 103.2
- Water _____do____ 1620
- Toluene _____do____ 859
- Diethyl ether _____do____ 578

The same method was used to prepare this resin as that used in Example 1. The resin was diluted with toluene to 45 per cent solids. 0.1 per cent by weight of triethanol amine was mixed with the resin to decrease the curing time. A glass fiber fabric was dipped in the solution of the resin. The treated glass fabric was air dried 30 minutes at 20° C. and was then heated at a temperature of 140° for 15 minutes. A laminated panel board was formed by pressing a stack of six layers of the treated glass fabric at a pressure of 1000 pounds per square inch at 175° C. for 1 hour. The finished laminate contained 33.8 per cent of the resin by weight and had a thickness of 0.08 inch. The laminate was glossy and well polished.

Example 4

A resin was prepared of the following composition, employing reactants and reagents as indicated:

Composition:
- $CH_3SiO_{1.5}$ _____mol percent__ 50
- $C_6H_5SiO_{1.5}$ _____do____ 40
- $(CH_3)_2SiO$ _____do____ 10

Reagents:
- $CH_3SiCl_3$ ---------- parts by weight -- 324
- $C_6H_5SiCl_3$ ---------- do ---- 366
- $(CH_3)_2SiCl_2$ ---------- do ---- 56.1
- Water ---------- do ---- 2200
- Toluene ---------- do ---- 1360
- Diethyl ether ---------- do ---- 977.5

The resin was prepared by the method of Example 1. The resin was diluted with toluene to 50 percent solids. No catalyst was added to the resin to decrease the curing time. A glass fiber fabric was dipped in the solution of the resin. The treated glass fabric was air dried at 20° C. for 30 minutes and was then heated at a temperature of 140° C. for 8 minutes. A laminated panel board was formed by pressing a stack of six layers of the treated glass fabric at a pressure of 1000 pounds per square inch at 175° C. for 1 hour. The finished laminate contained 38 per cent by weight of the resin and was 0.09 inch thick. The laminate was glossy and well polished.

*Example 5*

A resin was prepared of the following composition, employing reactants and reagents as indicated:

Composition:
- $CH_3SiO_{1.5}$ ---------- mol percent -- 50
- $C_6H_5SiO_{1.5}$ ---------- do ---- 40
- $(CH_3)_2SiO$ ---------- do ---- 10

Reagents:
- $CH_3SiCl_3$ ---------- parts by weight -- 872.6
- $C_6H_5SiCl_3$ ---------- do ---- 987.3
- $(CH_3)_2SiCl_2$ ---------- do ---- 150.6
- Water ---------- do ---- 4945
- Toluene ---------- do ---- 2595
- Diethyl ether ---------- do ---- 1879

The resin, prepared by the method of Example 1, was divided into 4 portions.

The first portion was diluted with toluene to 45 per cent solids. 0.1 per cent by weight triethanol amine was added to the resin to decrease the curing time. A glass fiber fabric was dipped in the solution of the resin. The glass fabric was then air-dried at 20° C. for 30 minutes and subsequently was heated at a temperature of 125° C. for 10 minutes. A laminated panel board was formed by pressing a stack of nine layers of the treated glass fabric at a pressure of 1000 lbs. per square inch at a temperature of 175° C. for 1 hour. The finished laminate contained 31.7 per cent of the resin by weight and had a thickness of 0.135 inch. The laminate was glossy and well polished.

The second portion of the resin was diluted with toluene to 45 per cent solids. 0.1 per cent triethanol amine was added to the resin to decrease the curing time. A glass fiber fabric was dipped in the solution of the resin, and was air dried at 20° C. for 30 minutes. The glass fabric was then heated at a temperature of 140° C. for 15 minutes. A laminated panel board was formed by pressing a stack of nine layers of the treated glass fabric at a pressure of 1000 pounds per square inch at 175° C. for 1 hour. The finished laminate was 0.145 inch thick and was glossy. After soaking in water and while still wet the laminate had a power factor of 2.77 and a dielectric constant of 4.7.

The third portion of the resin was diluted with toluene to 45 per cent solids. 0.1 per cent triethanol amine was added to the resin to decrease the curing time. The glass fiber fabric was dipped in the solution of the resin. The glass fabric was then air-dried at 20° C. for 30 minutes and subsequently was heated at a temperature of 140° C. for 15 minutes. Thirty sheets of the treated glass cloth were stacked and pressed at 1000 pounds per square inch at a temperature of 175° C. for 1 hour. The laminate had a flexural strength of 15,000 pounds per square inch at 25° C. The bond strength of this laminate was 1295 pounds per square inch. The bond strength was determined by pressing a steel ball into the edge of the laminated panel.

The fourth portion of the resin was used to form a composition consisting of 45 per cent by weight of the resin, 35 per cent by weight of asbestos and 20 per cent by weight of a diatomaceous earth, such as "Celite." 0.1 per cent by weight of triethanol amine was added to the composition to decrease the curing time. The composition was then formed into insulating bars by the method used in Example 1. The flexural strength of the insulating bars at 25° C. was 6190 pounds per square inch, and at 200° C. the flexural strength was 3453 pounds per square inch.

That which is claimed is:

1. A resinous polysiloxane essentially all the siloxane structural units of which are as follows:

$CH_3SiO_{1.5}$
$C_6H_5SiO_{1.5}$
$(CH_3)_2SiO$ of which structural units between 10 and 80 mol per cent are monomethyl siloxane units, between 10 and 65 mol per cent are phenyl siloxane units, and between 2.5 and 45 mol per cent are dimethyl siloxane units, in which siloxane the silicon atoms are linked together by an alternating lattice of oxygen and silicon atoms.

2. A resinous polysiloxane essentially all the siloxane structural units of which are as follows:

$CH_3SiO_{1.5}$
$C_6H_5SiO_{1.5}$
$(CH_3)_2SiO$ of which structural units between 10 and 80 mol per cent are monomethyl siloxane units, between 10 and 65 mol per cent are phenyl siloxane units, and between 20 and 45 mol per cent are dimethyl siloxane units, in which siloxane the silicon atoms are linked together by an alternating lattice of oxygen and silicon atoms.

MELVIN J. HUNTER.
EARLE J. SMITH.

References Cited in the file of this patent

UNITED STATES PATENTS

| Number | Name | Date |
|---|---|---|
| 2,258,222 | Rochow | Oct. 7, 1941 |
| 2,383,827 | Sprung | Aug. 28, 1945 |
| 2,398,672 | Sauer | Apr. 16, 1946 |
| 2,406,621 | Marsden | Aug. 27, 1946 |
| 2,442,212 | Rochow | May 25, 1948 |
| 2,447,611 | Collings | Aug. 24, 1948 |
| 2,450,594 | Hyde | Oct. 5, 1948 |
| 2,470,479 | Ferguson et al | May 17, 1949 |
| 2,508,196 | Seidel et al. | May 16, 1950 |

FOREIGN PATENTS

| Number | Country | Date |
|---|---|---|
| 548,911 | Great Britain | Oct. 29, 1942 |
| 572,230 | Great Britain | Sept. 28, 1945 |

Certificate of Correction

Patent No. 2,652,385 September 15, 1953

MELVIN J. HUNTER ET AL.

It is hereby certified that error appears in the printed specification of the above numbered patent requiring correction as follows:

Column 1, line 44, for "4.5 mol per cent" read *45 mol per cent*;

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*